United States Patent
Na et al.

(10) Patent No.: US 9,904,359 B2
(45) Date of Patent: Feb. 27, 2018

(54) HEAD-MOUNTED DISPLAY CONTROLLED BY TAPPING, METHOD FOR CONTROLLING THE SAME AND COMPUTER PROGRAM PRODUCT FOR CONTROLLING THE SAME

(71) Applicant: FXGear Inc., Seoul (KR)

(72) Inventors: Kyung Gun Na, Seoul (KR); Kwang Jin Choi, Seoul (KR)

(73) Assignee: FXGear Inc., Seoul (KR)

( * ) Notice: Subject to any disclaimer, the term of this patent is extended or adjusted under 35 U.S.C. 154(b) by 131 days.

(21) Appl. No.: 14/538,542

(22) Filed: Nov. 11, 2014

(65) Prior Publication Data
US 2016/0077651 A1   Mar. 17, 2016

(30) Foreign Application Priority Data
Sep. 17, 2014 (KR) .................. 10-2014-0123344

(51) Int. Cl.
*G06F 3/01* (2006.01)
*G02B 27/01* (2006.01)
(52) U.S. Cl.
CPC ........... *G06F 3/012* (2013.01); *G02B 27/017* (2013.01); *G02B 2027/0187* (2013.01)
(58) Field of Classification Search
CPC ..... G06F 3/0416; G06F 3/012; G02B 27/017; G02B 2027/0187
See application file for complete search history.

(56) References Cited

U.S. PATENT DOCUMENTS

| 6,861,946 | B2 * | 3/2005 | Verplaetse | G06F 1/1626 340/315 |
| 8,872,941 | B2 | 10/2014 | Asukai et al. | |
| 8,989,269 | B2 | 3/2015 | Kim et al. | |
| 9,134,800 | B2 | 9/2015 | Maeda | |
| 2010/0259471 | A1 | 10/2010 | Takano et al. | |
| 2011/0254806 | A1 * | 10/2011 | Jung | G06F 3/0416 345/174 |
| 2012/0235902 | A1 * | 9/2012 | Eisenhardt | A42B 3/042 345/156 |

(Continued)

FOREIGN PATENT DOCUMENTS

JP   H11-161190   6/1999
JP   2008-118526 A   5/2008

(Continued)

OTHER PUBLICATIONS

Korean Intellectual Property Office, Office Action, Korean Patent Application No. 10-2014-0123344, dated Apr. 27, 2016, five pages. [with concise explanation of relevance in English].

*Primary Examiner* — Amr Awad
*Assistant Examiner* — Stephen Bray
(74) *Attorney, Agent, or Firm* — Fenwick & West LLP (57) ABSTRACT

A head-mounted display (HMD) may include a sensor unit, a display unit configured to display an image, and a control unit for measuring a tapping applied to the head-mounted display from a measurement value obtained by the sensor unit, and controlling the image displayed on the display unit by using the tapping as an input signal. When the HMD is used, an image displayed on the HMD may be controlled by using a tapping applied to the HMD as an input signal, and thus, an event may be processed without using any additional controller.

7 Claims, 7 Drawing Sheets

(56) References Cited

U.S. PATENT DOCUMENTS

| | | | |
|---|---|---|---|
| 2013/0214998 A1* | 8/2013 | Andes | G02B 27/017 345/8 |
| 2013/0249946 A1* | 9/2013 | Kimura | G02B 27/017 345/633 |
| 2015/0312559 A1* | 10/2015 | Ueno | H04N 13/0014 348/53 |
| 2015/0347717 A1* | 12/2015 | Dalal | G06F 19/3481 434/258 |

FOREIGN PATENT DOCUMENTS

| | | |
|---|---|---|
| JP | 2010-097289 A | 4/2010 |
| JP | 2014-072575 A | 4/2014 |
| KR | 10-2012-0066309 A | 6/2012 |
| WO | WO 2012/011263 A1 | 1/2012 |

\* cited by examiner

HEAD-MOUNTED DISPLAY CONTROLLED BY TAPPING, METHOD FOR CONTROLLING THE SAME AND COMPUTER PROGRAM PRODUCT FOR CONTROLLING THE SAME

CROSS-REFERENCE TO RELATED APPLICATION

This application claims priority to Korean Patent Application No. 10-2014-0123344, filed on Sep. 17, 2014, and all the benefits accruing therefrom under 35 U.S.C. § 119, the contents of which in its entirety are herein incorporated by reference.

BACKGROUND

1. Field

Embodiments relate to a head-mounted display (HMD), a method for controlling the same and a computer program product for controlling the same, and more particularly, to a HMD controlled by a tapping applied thereto without any additional controller and its controlling technique.

2. Description of the Related Art

A head-mounted display (HMD) is a portable display worn on the head of a user. A HMD is worn on the head like a goggle or helmet so that an image is focused near the eyes of the user. A user who is wearing the HMD may feel as if he/she is in a virtual reality since the entire visibility is covered by an image. For this reason, the HMD is applied to various fields for military, medical or personal purposes.

For example, Japanese Patent Application Publication No. 1999-161190 discloses a technique for detecting a motion of a head portion of a user and controlling information displayed on a display device by using the detected result. However, in such conventional HMDs, the motion of a user is used just for changing a viewpoint displayed on the display device, and in order to control an event about the displayed information, a controller such as a touch pad, a game pad or the like is additionally required.

SUMMARY

An aspect of the present disclosure is directed to providing a head-mounted display (HMD) which is configured to control an image displayed on the HMD without any additional controller by using a tapping applied thereto as an input signal, a method for controlling the same and a computer program product for controlling the same.

A HMD according to an embodiment includes: a sensor unit; a display unit configured to display an image; and a control unit for measuring a tapping applied to the head-mounted display from a measurement value obtained by the sensor unit, and controlling the image displayed on the display unit by using the tapping as an input signal.

The control unit may detect tapping information applied to the head-mounted display by comparing the measurement value with a preset reference value. Herein, the tapping information may include presence, frequency, and location information of the tapping. In addition, the measurement value and the reference value may be based on at least one of a motion of a user who is wearing the head-mounted display and sound generated at the head-mounted display.

The control unit may be configured to change at least one of kind, output part, output form and playback speed of the image displayed on the display unit by using the tapping as the input signal.

A method for controlling a head-mounted display according to an embodiment includes: displaying an image on the head-mounted display; measuring a tapping applied to the head-mounted display; and controlling the image displayed on the head-mounted display by using the tapping as an input signal.

The measuring of a tapping may include detecting tapping information applied to the head-mounted display by comparing the measurement value, obtained by a sensor unit of the head-mounted display, with a preset reference value. Herein, the tapping information may include presence, frequency, and location information of the tapping. In addition, the measurement value and the reference value may be based on at least one of a motion of a user who is wearing the head-mounted display and sound generated at the head-mounted display.

The controlling of the image displayed on the head-mounted display may include changing at least one of kind, output part, output form and playback speed of the image displayed on the display unit by using the tapping as the input signal.

A computer program product according to an embodiment is configured to perform the method for controlling the HMD. The computer program product may be implemented or stored in a non-transitory medium.

When the HMD and its control method according to the present disclosure are used, since an image displayed on the HMD can be controlled by using a tapping applied to the HMD as an input signal, an event may be processed without any additional controller.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. However, in the description, details of well-known features and techniques may be omitted to avoid unnecessarily obscuring the presented embodiments. In addition, the shape, size and regions, and the like, of the drawing may be exaggerated for clarity and may not mean the actual dimension.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed on the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

Hereinafter, embodiments will be described in detail with reference to the drawings.

Figure 1:
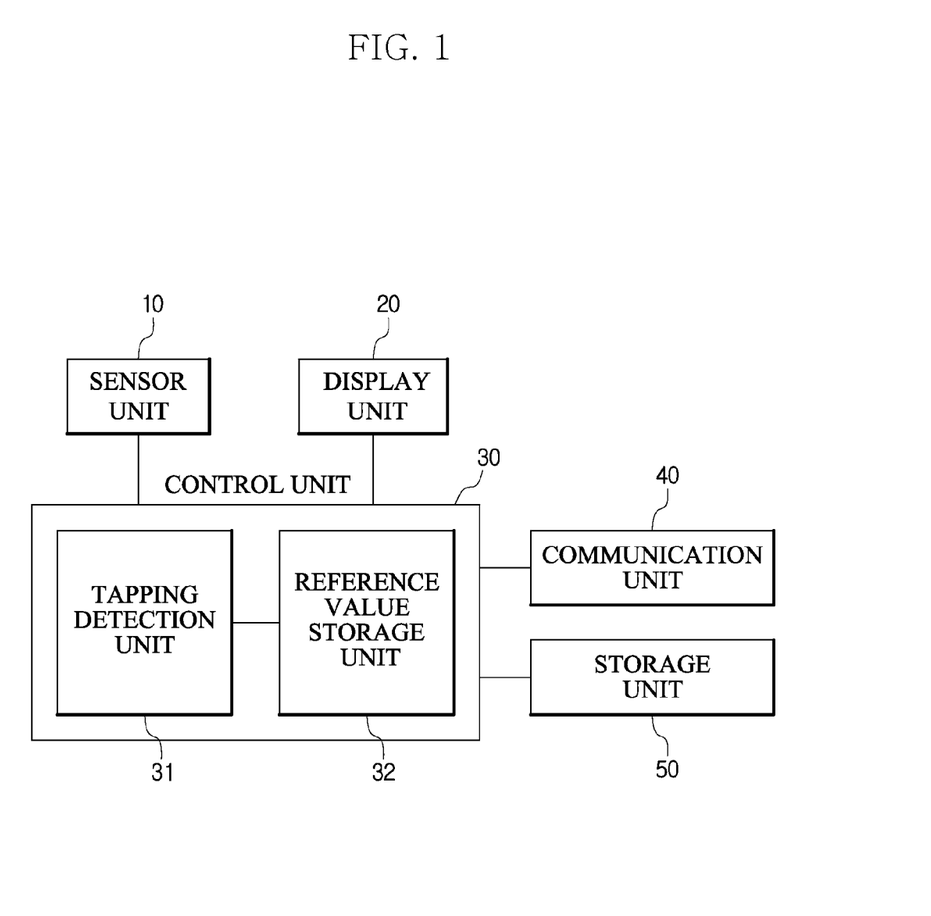
FIG. 1 is a block diagram showing a head-mounted display (HMD) according to an embodiment.
Figure 2A:
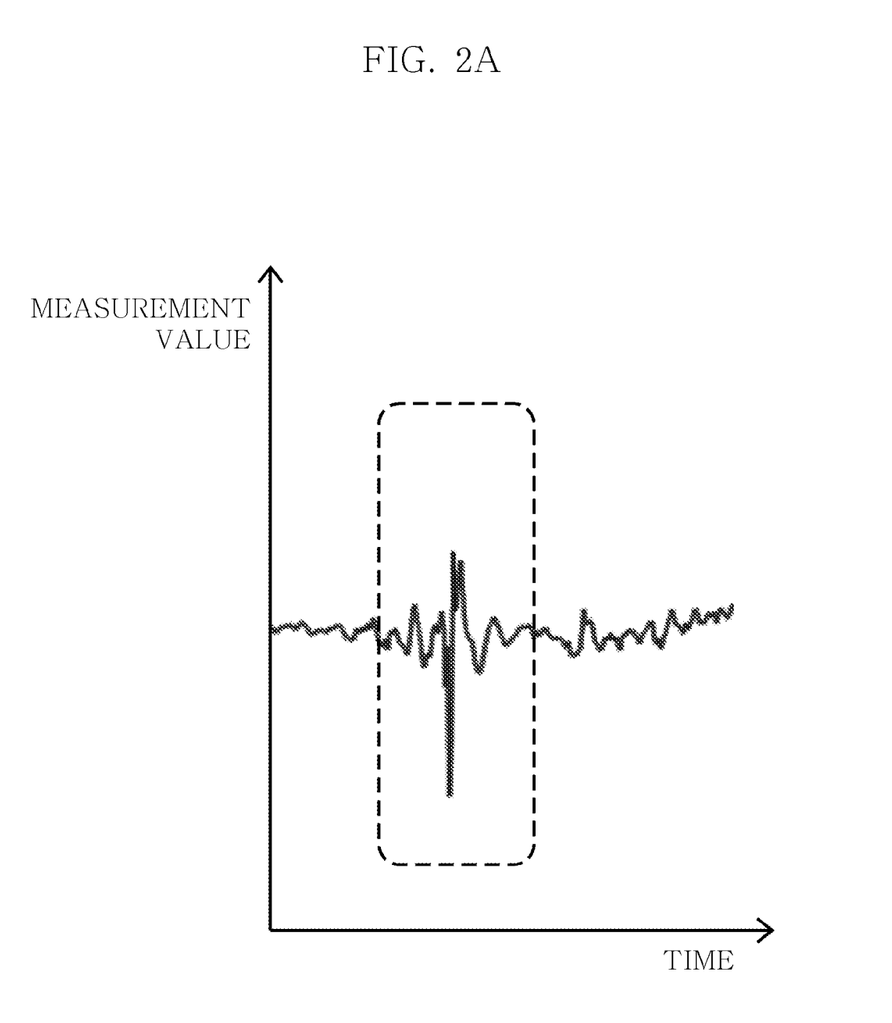
FIGS. 2A to 2E are graphs showing waveforms of exemplary reference signals used in the HMD according to an embodiment.
Figure 2B:
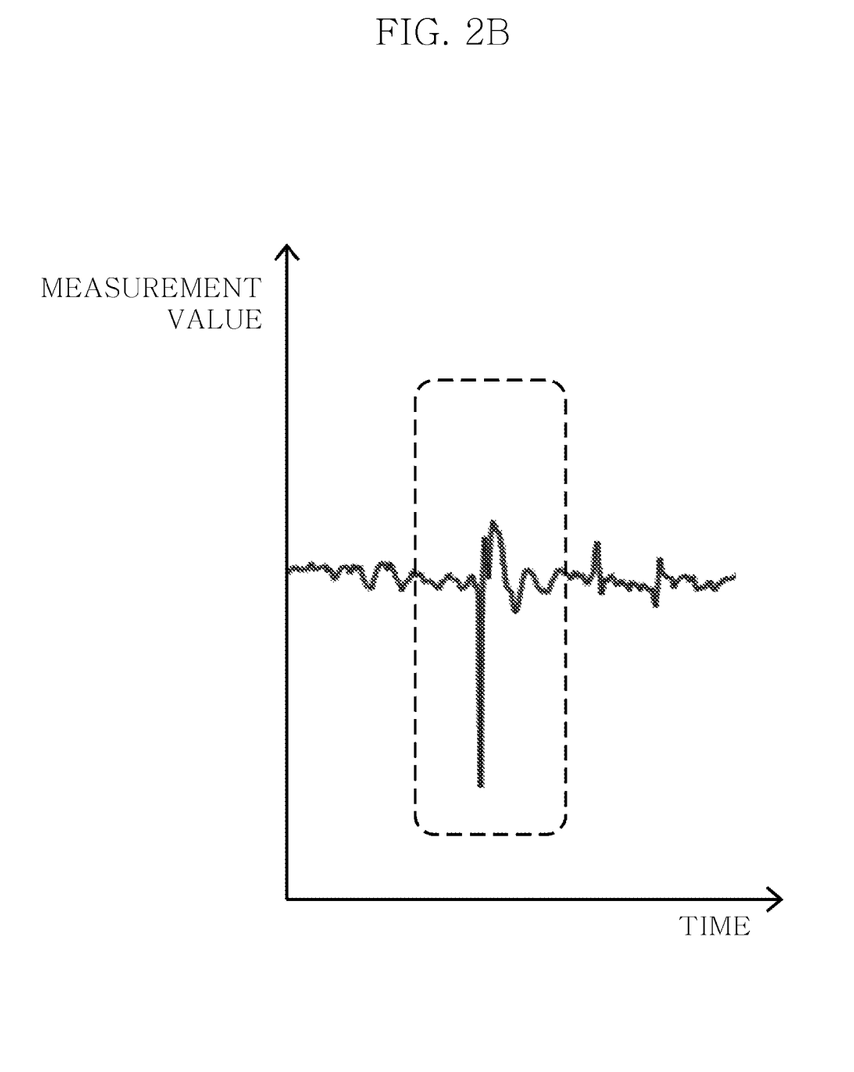
Figure 2C:
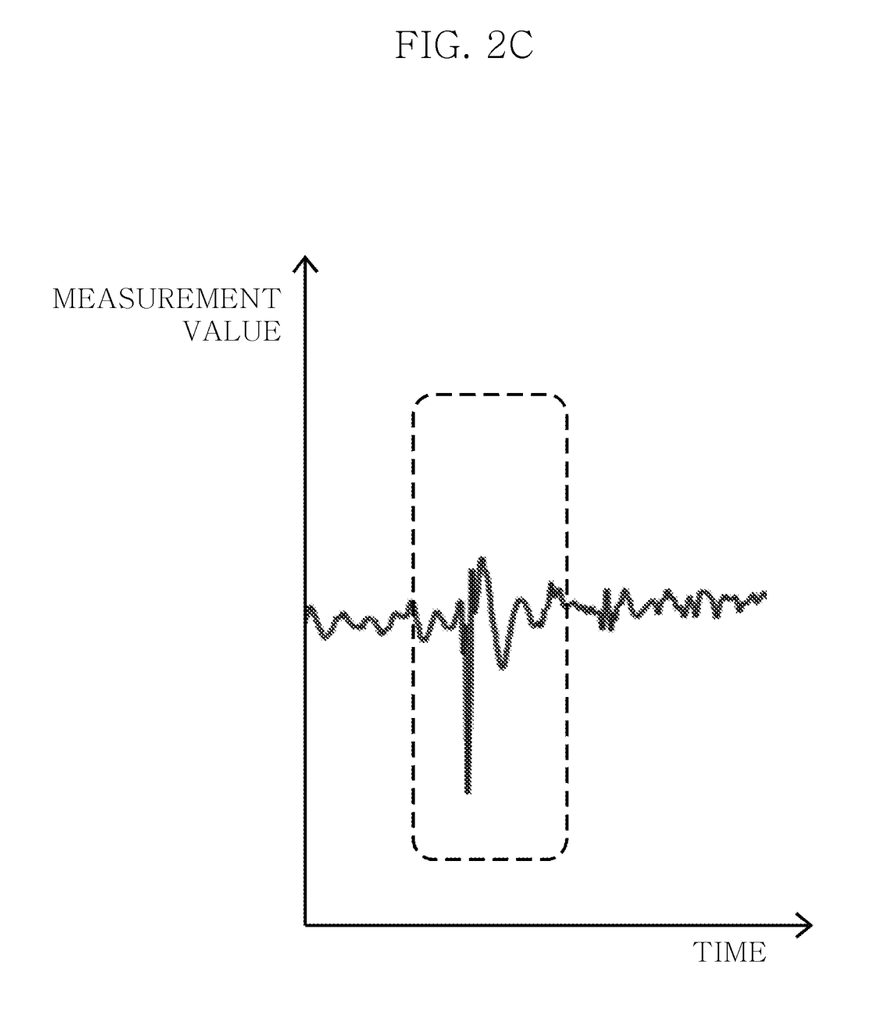
Figure 2D:
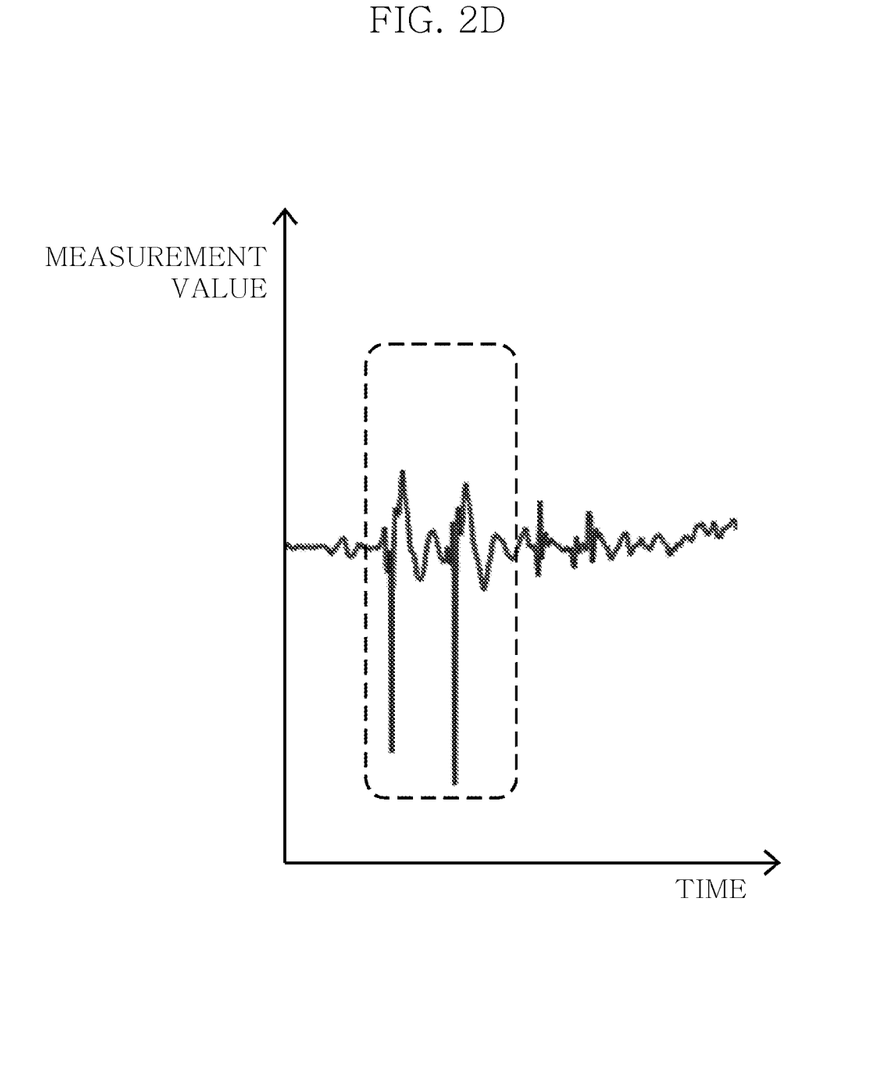
Figure 2E:
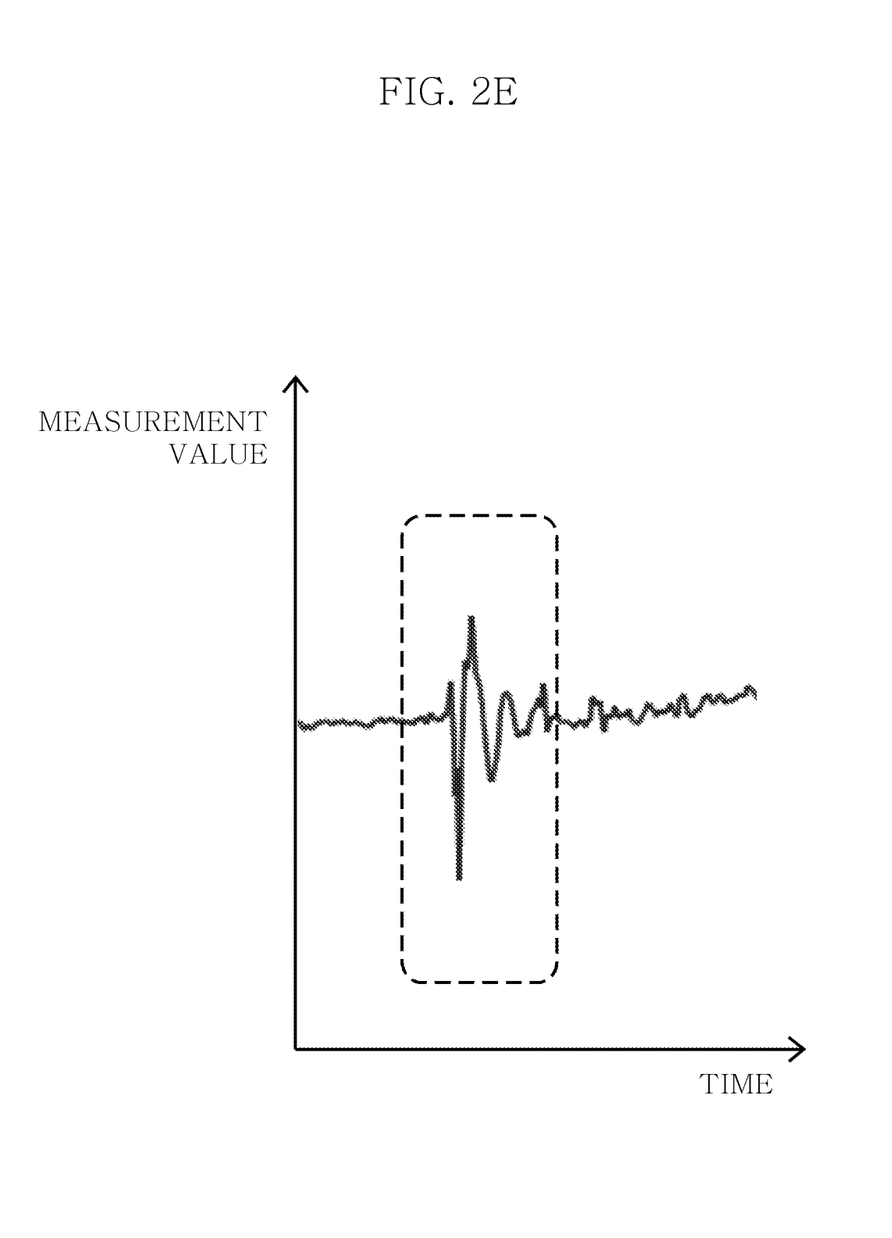

FIG. 1 is a block diagram showing a head-mounted display (HMD) according to an embodiment.

Referring to FIG. 1, the HMD includes a sensor unit 10, a display unit 20, and a control unit 30. In one embodiment, the HMD may further include a communication unit 40 and/or a storage unit 50. The HMD of this embodiment is configured to be worn on the head of a user, and may include one or more fixture units (not shown) as necessary. For example, depending on embodiments, the HMD may be implemented as a goggle or a helmet, without being limited thereto.

The HMD according to embodiments may be configured to be entirely hardware, entirely software, or partially hardware and partially software. For example, in this specification, each "unit" of the HMD may generally designate hardware and software for operating the hardware. In addition, the hardware may be a data processing unit including a central processing unit CPU or another processor. Moreover, the software may designate a process in execution, an object, an executable file, a thread of execution, a program or the like.

In addition, the units of the HMD according to embodiments are not necessarily intended to indicate physically distinguished components. In FIG. 1, the sensor unit 10, the display unit 20 and the control unit 30 are depicted as blocks distinguished from each other, but depending on embodiments, all or a part of the sensor unit 10, the display unit 20 and the control unit 30 may be integrated into a single element. For example, a smartphone equipped with a processing unit such as a microprocessor, an acceleration sensor and a touch screen may correspond to at least one of the sensor unit 10, the display unit 20 and the control unit 30, and this smartphone may be coupled to another member (not shown) mounted to the head of a user to configure a HMD of the present disclosure. In other words, the HMD disclosed in the specification may be a smartphone which may be mounted to the head of a user by using other elements.

The sensor unit 10 is used for obtaining a measurement value which is to be a basis for detecting a tapping applied to the HMD by the user. For example, the sensor unit 10 may include at least one sensor capable of measuring a motion of a user who is wearing the HMD, such as an accelerometer, a magnetometer and/or a gyroscope. In this case, the measurement value obtained by the sensor is compared with a reference value of a motion corresponding to the tapping to measure a tapping applied to the HMD. Alternatively, the sensor unit 10 may include at least one sensor capable of measuring sound, such as a microphone, and in this case, a tapping may be measured by using sound generated when the HMD is tapped. A detailed process for measuring a tapping will be described later in detail.

If the sensor unit 10 includes one or more sensors configured to measure a motion of a user, the measurement value of the sensor unit 10 may be used not only for detecting a tapping but also for changing a viewpoint corresponding to a displayed image according to a viewpoint of the user. By doing so, while outputting a part of a wide viewing angle image, a displayed portion of the image is moved according to the motion of the head of the user who is wearing the HMD so that the user may feel reality. This display pattern is substantially identical to that of an existing HMD. For example, if the user turns his head to the right, the entire image displayed on the display unit 20 is moved to the left so that the user may feel as if he turns his head to see a right side in a virtual space. However, this is just an example, and in another embodiment, the sensor unit 10 may also be provided just to measure a tapping applied to the HMD and a motion of the user may be measured by another device separate from the sensor unit 10.

The display unit 20 is located near the eye(s) of the user to display an image. The display unit 20 may include a liquid crystal display device (LCD) or another suitable image display element. In addition, the display unit 20 may further include at least one optical element such as a convex lens so that the image displayed by the image display element is focused at or near the eye of the user. As used herein, the image displayed on the display unit 20 should be interpreted as including a single image such as a photograph or a series of successive images such as a video. For example, contents such as a moving picture containing video and/or audio may also be included in the image disclosed in this specification.

In an embodiment, the HMD may further include the communication unit 40, and the image displayed on the display unit 20 may be received from a remote server (not shown) through a network by the communication unit 40. For example, the communication unit 40 may receive an image in a streaming manner. In addition, the HMD may transmit data to a remote server through the communication unit 40. In another embodiment, the image displayed on the display unit 20 may be stored in the storage unit 50 in advance. The storage unit 50 may store an image to be displayed on the display unit 20 or other additional data.

The control unit 30 is communicatively connected to the sensor unit 10 and the display unit 20 to detect a tapping applied to the HMD from the measurement value obtained by the sensor unit 10. In addition, if a tapping is detected, the control unit 30 controls an image displayed on the display unit 20 by using the tapping as an input signal. The control unit 30 may process various events associated with the image by using the tapping as an input signal. Herein, the event may indicate a change of kind, output part, output form, playback speed or the like of the image. For example, the event may include selection of an image to be displayed; initiation or interception of playback of an image; in case the image is a time-lapse moving picture, switching of a display pattern such as fast forward, rewind, increase or decrease of a playback speed, increase or decrease of an output volume, and switching to a full screen mode; and an operation of a user interface such as selection of a menu, button or icon displayed on the image, without being limited thereto. If the image is a part of virtual reality (VR) or augmented reality (AR) application, an interaction with the application may be performed by tapping the HMD.

If a tapping is not applied to the HMD, the control unit 30 may control an image displayed on the display unit 20 so that a viewpoint corresponding to the image may change according to a motion of the user, similar to the conventional HMD. For example, if the user turns his head to the right, the control unit 30 moves the entire image displayed on the display unit 20 to the left. However, when a tapping applied to the HMD is detected from the measurement value obtained by the sensor unit 10, the control unit 30 controls the image displayed on the display unit 10 by using the tapping as an input signal. Therefore, the user who is wearing the HMD of this embodiment may interact with the image just by tapping his head without any additional controller.

In an embodiment, the control unit 30 includes a tapping detection unit 31 and a reference value storage unit 32. The tapping detection unit 31 is configured to detect a tapping applied to the HMD by comparing the measurement value obtained from the sensor unit 10 with a preset reference value stored in the reference value storage unit 32. The tapping detection unit 31 is configured to detect a tapping applied to the HMD. In order to detect a tapping applied to the HMD, the tapping detection unit 31 may be configured to detect a tapping applied to a specific contact area (not shown) separately provided or may be configured to detect a tapping applied to any portion of the HMD. In addition, in an embodiment, the tapping detection unit 31 may be further configured to distinguish a portion of the HMD to which a tapping is applied. The measurement value of the sensor unit 10 and the reference value stored in the reference value storage unit 32 may have suitable formats depending on the kind of sensor provided in the sensor unit 10 to detect a tapping.

In an embodiment, the measurement value and the reference value may be respectively a signal based on a motion of a user who is wearing the HMD, and the signal based on a motion may use at least one of speed, acceleration, angular velocity and/or orientation. When the sensor unit 10 is composed of at least one sensor capable of measuring vibration, if the user taps a surface of any portion of the HMD, a signal intensity or a pattern of the vibration measured by the sensor unit 10 abruptly changes due to the vibration caused by the tapping. Therefore, the tapping detection unit 31 may distinguish a common motion of the head of the user from a tapping applied to the HMD, and if a tapping is detected instead of a common motion, the image may be controlled by using the tapping information as an input signal.

In another embodiment, the measurement value and the reference value may be respectively a signal based on sound generated at the HMD. When the sensor unit 10 is composed of at least one sensor capable of measuring sound, if the user taps a surface of the HMD, an intensity of signal measured by the sensor unit 10 increases. At this time, the tapping detection unit 31 may figure out that the HMD is tapped by means of the increased intensity of the signal measured by the sensor unit 10, and the image may be controlled by using the tapping information as an input signal.

The process of detecting tapping information will be described in more detail. First, the tapping detection unit 31 may compare the measurement value of the sensor unit 10 with reference tapping signals, stored as a database in the reference value storage unit 32 in advance, by means of template matching to calculate similarity. The similarity may be calculated by using a normalized cross correlation algorithm. As a result, the similarity is calculated as in Equation 1 below.

$$1/n\sum_{x=1}^{n} (S(x) - S_{average})(T(x) - T_{average})/\delta_S \delta_T \qquad \text{Equation 1}$$

In Equation 1, $S(x)$ represents a measurement signal of the sensor unit 10, and $T(x)$ represents a pre-stored reference tapping signal. $\delta_S$ and $\delta_T$ respectively represents standard deviations of measurement signals and reference signals, and $S_{average}$ and $T_{average}$ respectively represent averages of measurement signals and reference signals. If the similarity calculated through Equation 1 is equal to or greater than a predetermined threshold value for signals measured during a specific time period, the tapping detection unit 31 may determine that the HMD is tapped.

If reference signals are more specifically classified, the tapping detection unit 31 may not only detect presence and frequency of the tapping but also obtain tapping information including information about a tapped location. In other words, reference signals for upper, lower, right and lower directions of the HMD or reference signals at every location classified in another way may be stored in advance, and the measurement value of the sensor unit 10 may be compared with the reference signal of each location to determine that a location corresponding to a reference signal with highest similarity is tapped.

However, the above tapping information calculating process is just an example, and in a HMD of another embodiment, a tapping applied to the HMD may be detected in a different manner.

FIGS. 2A to 2E are graphs showing waveforms of exemplary reference signals used in the HMD according to an embodiment, in which waveforms of reference signals using an accelerometer are depicted.

As shown in a dotted rectangle in each graph of FIGS. 2A to 2E, a reference signal representing a tapping has a peak, where the measurement value abruptly increases, in a specific region due to a tapping. For example, in the peak, an acceleration measurement value may be about 8.5 m/s$^2$, without being limited thereto. By comparing the measurement value of the sensor unit 10 with such a reference signal, it may be determined that a tapping occurs when the similarity is equal to or greater than a predetermined threshold value (for example, 70%).

Figure 3:
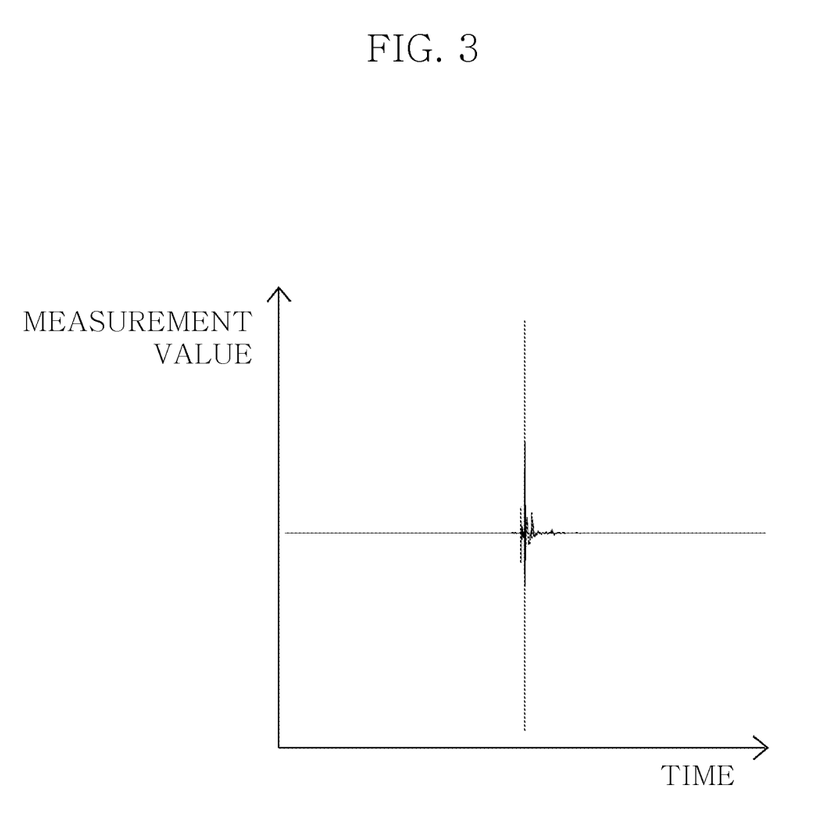
FIG. 3 is a graph showing a waveform of an exemplary reference signal used in the HMD according to an embodiment.

FIG. 3 is a graph showing a waveform of an exemplary reference signal used in the HMD according to an embodiment, in which a waveform of a reference signal using sound is depicted.

Similar to the acceleration measurement value described above with reference to FIGS. 2A to 2E, a reference signal using sound also has a peak, where the measurement value abruptly increases, in a specific region due to a tapping. For example, in the reference signal, a sound measurement value may be about −5 dB at the peak and also have a lowest value of about −75 dB, without being limited thereto. By comparing the measurement value of the sensor unit 10 with such a reference signal, it may be determined that a tapping occurs when the similarity is equal to or greater than a predetermined threshold value (for example, 70%).

However, the waveforms of reference signals described above with reference to FIGS. 2 and 3 are just examples, and kind, waveform, signal intensity or the like of a reference signal for determining whether a measurement value of a sensor is a tapping or not may be suitably determined according to sensitivity of the used sensor or an application used.

Operations of the HMD described above and a method for controlling the same may be at least partially implemented using a computer program and recorded in a non-transitory, computer-readable recording medium. The computer-readable recording medium includes any kind of recording device where computer-readable data is stored. The computer-readable recording medium may be, for example, ROM, RAM, CD-ROM, a floppy disk, a floppy disk, an optical data storage or the like, and may also be implemented in a carrier wave form (for example, transmission through Internet). In addition, the computer-readable recording medium may be distributed to computer systems connected through a network so that computer-readable codes are stored and executed in a distribution way. Moreover, functional programs, codes and code segments for implementing the above embodiments may be easily understood by those skilled in the art.

While the exemplary embodiments have been shown and described, it will be understood by those skilled in the art that various changes and modifications in form and details may be made thereto without departing from the spirit and scope of this disclosure as defined by the appended claims. Therefore, the true protection scope of the present disclosure should be defined by the appended claims.

What is claimed is:

1. A head-mounted display, comprising:
   a sensor unit;
   a display unit configured to display an image; and
   a control unit configured to:
      determine whether a measurement value obtained by the sensor unit is indicative of either a motion of a user wearing the head-mounted display or a tapping applied to the head-mounted display by calculating a similarity between the measurement value and a preset reference value using a normalized cross correlation algorithm which uses an average of the measurement value within a predetermined time period and a standard deviation of the measurement value obtained by the sensor within the predetermined time period, and an average of the preset reference value and a standard deviation of the preset reference value, and by determining that the tapping has occurred when the calculated similarity is equal to or greater than a predetermined threshold and by determining that a motion of the user has occurred when the calculated similarity is lower than the predetermined threshold wherein the motion is not the tapping; and
      responsive to the measurement value obtained by the sensor unit indicating motion of the user, change a viewpoint of the image in accordance with the motion of the user wearing the head-mounted display; and
      responsive to the measurement value obtained by the sensor unit indicating tapping applied to the head-mounted display, control the image displayed on the display unit by using the tapping as an input signal,
   wherein the similarity between the measurement value and the preset reference value is an average of numbers obtained by dividing a sum of an error of the measurement value and an error of the reference value by respective standard deviations of the measurement value and the reference value, and
   wherein the similarity between the measurement value and the preset reference value is calculated by following equation:

$$1/n \sum_{x=1}^{n} (S(x) - S_{average})(T(x) - T_{average}) / \delta_S \delta_T$$

where $S(x)$ represents the measurement value, $T(x)$ represents the reference value, $S_{average}$ represents the average of the measurement value, $T_{average}$ represents the average of the reference value, $\delta_S$ represents the standard deviation of the measurement value, and $\delta_T$ represents the standard deviation of the reference value.

2. The head-mounted display according to claim 1, wherein the measurement value and the reference value are based on at least one of a motion of a user who is wearing the head-mounted display and sound generated at the head-mounted display.

3. The head-mounted display according to claim 1, wherein the control unit is configured to change at least one of kind, output part, output form and playback speed of the image displayed on the display unit by using the tapping as the input signal.

4. A method for controlling a head-mounted display, comprising:
   displaying an image on the head-mounted display;
   determining whether a measurement value obtained by a sensor unit is indicative of either a motion of a user wearing the head-mounted display or a tapping applied to the head-mounted display based on a similarity between the measurement value and a preset reference value; and
   responsive to the measurement value obtained by the sensor unit indicating motion of the user, changing a viewpoint of the image in accordance with the motion of the user wearing the head-mounted display; and
   responsive to the measurement value obtained by the sensor unit indicating tapping applied to the head-mounted display, control the image displayed on the head-mounted display by using the tapping as an input signal,
   wherein determining whether the measurement value obtained by the sensor unit is indicative of either the motion of the user wearing the head-mounted display or the tapping applied to the head-mounted display comprises:
      calculating a similarity between the measurement value and the preset reference value using a normalized cross correlation algorithm which uses an average of the measurement value obtained within a predetermined time period and a standard deviation of the measurement value obtained within the predetermined time period, and an average of the preset reference value and a standard deviation of the preset reference value; and determining that the tapping has occurred when the calculated similarity is equal to or greater than a predetermined threshold, and determining that a motion of the user has occurred when the calculated similarity is lower than the predetermined threshold, wherein the motion is not the tapping, wherein the similarity between the measurement value and the preset reference value is an average of numbers obtained by dividing a sum of an error of the measurement value and an error of the reference value by respective standard deviations of the measurement value and the reference value, and wherein the similarity between the measurement value and the preset reference value is calculated by following equation:

$$1/n \sum_{x=1}^{n} (S(x) - S_{average})(T(x) - T_{average}) / \delta_S \delta_T$$

where $S(x)$ represents the measurement value, $T(x)$ represents the reference value, $S_{average}$ represents the average of the measurement value, $T_{average}$ represents the average of the reference value, $\delta_S$ represents the standard deviation of the measurement value, and $\delta_T$ represents the standard deviation of the reference value.

5. The method for controlling a head-mounted display according to claim 4, wherein the measurement value and the reference value are based on at least one of a motion of a user who is wearing the head-mounted display and sound generated at the head-mounted display.

6. The method for controlling a head-mounted display according to claim 4, wherein said controlling of the image displayed on the head-mounted display comprises changing at least one of kind, output part, output form and playback speed of the image displayed on the display unit by using the tapping as the input signal.

7. A non-transitory computer-readable recording medium comprising a computer program product, the computer program product is configured to perform the steps of:

displaying an image on a head-mounted display;

determine whether a measurement value obtained by a sensor unit is indicative of either a motion of a user wearing the head-mounted display or a tapping applied to the head-mounted display based on a similarity between the measurement value and a preset reference value; and responsive to the measurement value obtained by the sensor unit indicating motion of the user, changing a viewpoint of the image in accordance with the motion of the user wearing the head-mounted display; and responsive to the measurement value obtained by the sensor unit indicating tapping applied to the head-mounted display, controlling the image displayed on the head-mounted display by using the tapping as an input signal, wherein determining whether the measurement value obtained by the sensor unit is indicative of either the motion of the user wearing the head-mounted display or the tapping applied to the head-mounted display comprises:

calculating a similarity between the measurement value and the preset reference value using a normalized cross correlation algorithm which uses an average of the measurement value obtained within a predetermined time period and a standard deviation of the measurement value obtained within the predetermined time period, and an average of the preset reference value and a standard deviation of the preset reference value; and determining that the tapping has occurred when the calculated similarity is equal to or greater than a predetermined threshold, and determining that a motion of the user has occurred when the calculated similarity is lower than the predetermined threshold, wherein the motion is not the tapping, wherein the similarity between the measurement value and the preset reference value is an average of numbers obtained by dividing a sum of an error of the measurement value and an error of the reference value by respective standard deviations of the measurement value and the reference value, and wherein the similarity between the measurement value and a preset reference value is calculated by following equation:

$$1/n \sum_{x=1}^{n} (S(x) - S_{average})(T(x) - T_{average}) / \delta_S \delta_T$$

where $S(x)$ represents the measurement value, $T(x)$ represents the reference value, $S_{average}$ represents the average of the measurement value, $T_{average}$ represents the average of the reference value, $\delta_S$ represents the standard deviation of the measurement value, and $\delta_T$ represents the standard deviation of the reference value.

* * * * *